United States Patent Office 3,523,957
Patented Aug. 11, 1970

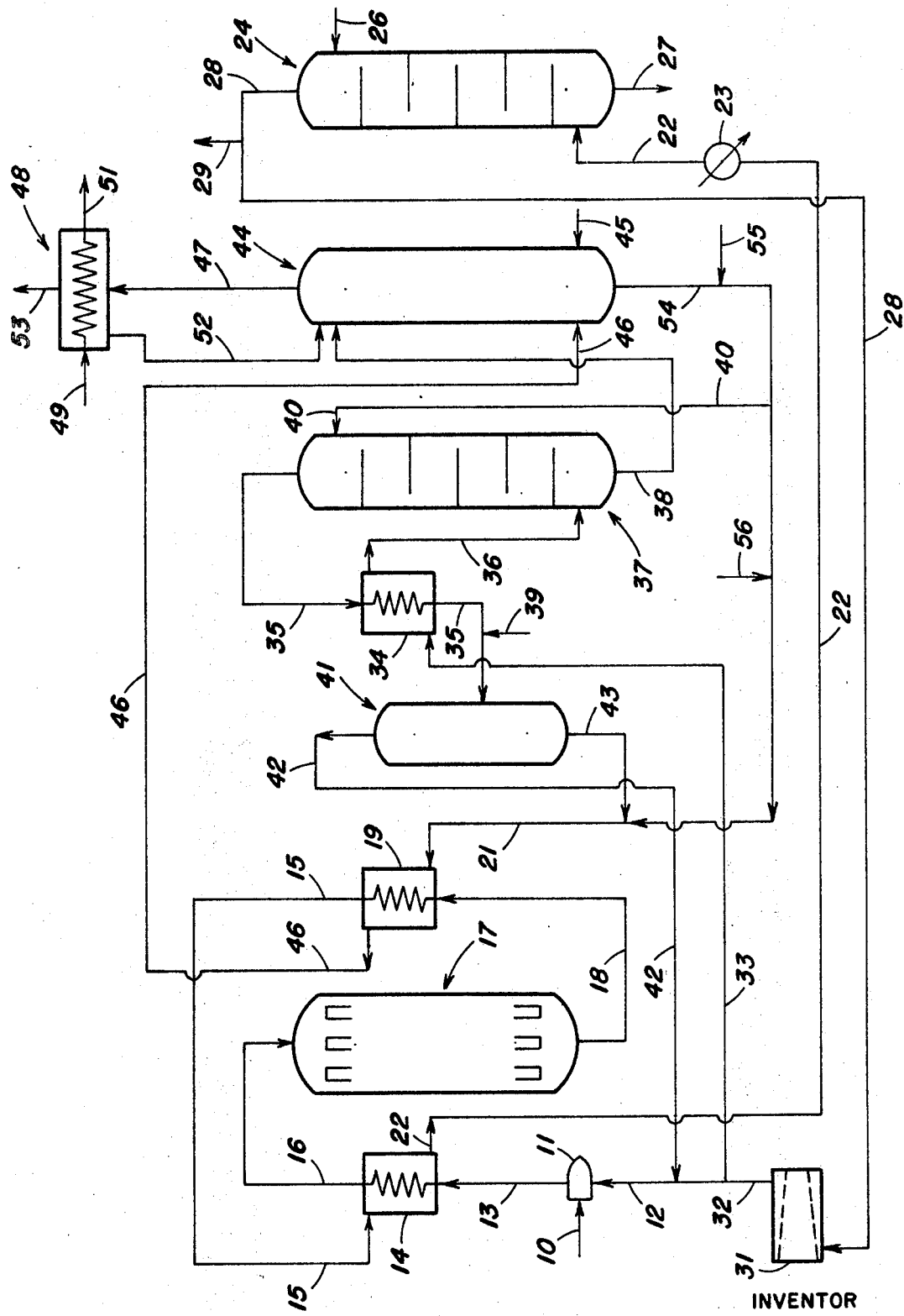

3,523,957
PROCESS FOR PRODUCING AN OLEFINIC OXIDE
Utah Tsao, Jersey City, N.J., assignor to The Lummus Company, New York, N.Y., a corporation of Delaware
Filed Dec. 7, 1966, Ser. No. 599,864
Int. Cl. C07d 1/14
U.S. Cl. 260—348.5    6 Claims

ABSTRACT OF THE DISCLOSURE

Process for oxidizing an olefin to an olefin oxide which includes provisions for absorbing carbon dioxide from the effluent and stripping carbon dioxide from the absorption solution wherein a portion of the stripped absorption solution is indirectly heated by the effluent from the olefin oxidation and recycled to the stripping operation to provide a portion of the heat requirements therefor. The vent gases from the stripping are employed to heat make-up water for the process.

---

This invention relates to the production of olefinic oxides and more particularly to a more efficient utilization of heat in such production.

Olefinic oxides are generally produced by the direct catalytic oxidation of an olefin at elevated temperatures and pressures. Ethylene oxide, for example, is produced by oxidizing ethylene at temperatures ranging from 150° C.–450° C. and pressures ranging from atmospheric pressure to 500 p.s.i. or higher in the presence of a silver catalyst. The reaction is exothermic and the effluent withdrawn from the reactor, containing ethylene oxide, ethylene, carbon dioxide, and inerts introduced with the reactants, is cooled, e.g., by indirect heat transfer with feed to the reactor, prior to further processing.

The cooled effluent is introduced into an absorber wherein ethylene oxide is recovered therefrom by direct contact with a lean absorbent, such as water, which selectively absorbs ethylene oxide. An ethylene oxide rich absorption solution is withdrawn from the absorber and introduced into a stripper wherein ethylene oxide is recovered therefrom as a gaseous overhead. Lean absorbent substantially free of ethylene oxide is withdrawn as stripper bottoms and recycled to the ethylene oxide absorber.

A gaseous overhead withdrawn from the ethylene oxide absorber, containing ethylene, carbon dioxide and inerts is recycled to the ethylene oxide reactor. In some processes, this overhead is introduced into an absorber prior to being recycled to the reactor and contacted therein with a lean absorbent that selectively absorbs carbon dioxide. A carbon dioxide rich absorbent substantially free of carbon dioxide is withdrawn from the stripper and recycled to the carbon dioxide absorber.

An object of this invention is to more efficiently produce olefinic oxides.

Another object of this invention is to more efficiently recover heat in the production of olefinic oxides.

A further object of this invention is to lower the utilities requirements for the production of olefinic oxides.

Still another object of this invention is to more efficiently produce ethylene oxide.

These and other objects will become more readily apparent from reading the following detailed description of the invention wherein:

The drawing is a schematic flow diagram of an embodiment of the process of the invention.

The objects of this invention are accomplished in one aspect, by using vent gases from a carbon dioxide stripper for indirectly heating make-up feed water used in a process for producing an olefinic oxide. The objects of this invention are accomplished, in another aspect, by cooling the effluent from an ethylene oxide reactor with bottoms from the carbon dioxide stripper, the heated bottoms supplying a portion of the heat requirements for the carbon dioxide stripper.

Referring to the drawing, air or oxygen at an elevated pressure in line 10 is introduced into a mixing nozzle 11 and mixed therein with ethylene at an elevated pressure introduced through line 12. The source of ethylene will be described more fully hereinafter. An oxygen-ethylene mixture is withdrawn from the mixing nozzle 11 through line 13 and introduced into a heat exchanger 14 to effect preheating thereof. The mixture is heated in the heat exchanger 14 by a reaction product effluent introduced through line 15, as hereinafter more fully described. The heated mixture is withdrawn from the heat exchanger 14 through line 16 and introduced into a reactor 17 containing a suitable oxidation catalyst, such as silver, to effect oxidation of ethylene to ethylene oxide.

The oxidation reaction of ethylene to ethylene oxide is exothermic and the reactor 17 is provided with suitable cooling means (not shown) to prevent excessive temperatures. A heated gaseous effluent, containing ethylene oxide, ethylene, carbon dioxide, and inerts is withdrawn from the reactor 17 through line 18 and introduced into a heat exchanger 19. The effluent is cooled in the heat exchanger 19 by a coolant introduced through line 21, as hereinafter more fully described, and a partially cooled effluent is withdrawn therefrom through line 15. The reactor effluent in line 15 is introduced into the heat exchanger 14 to heat the feed mixture and is withdrawn therefrom through line 22.

The gaseous effluent in line 22 is passed through a cooler 23 and introduced into an absorber 24 to recover ethylene oxide. The absorber is provided with a suitable packing, such as trays or the like, for increasing gas-liquid contact. The effluent is contacted in the absorber 24 with a lean absorbent introduced through line 26 which absorbent selectively absorbs ethylene oxide. An ethylene oxide enriched absorbent is withdrawn from the absorber 24 through line 27 for recovery of ethylene oxide (not shown). A gaseous overhead containing ethylene, carbon dioxide and inerts is withdrawn from the absorber 24 through line 28 which is provided with a suitable vent line 29 to prevent build-up of inert gases in the system.

The gaseous overhead in line 28 is introduced into a compressor 31 and compressed therein to about the oxidation pressure of ethylene. The compressed gas is withdrawn from the compressor 31 through line 32 and a portion thereof passed through line 33 to a preheater 34. The compressed gas is indirectly heated in preheater 34 by a heating medium introduced through line 35, as hereinafter more fully described, and withdrawn therefrom through line 36. The preheated gas in line 36 is introduced into an absorber 37 and contacted therein with a lean absorption solution introduced through line 40 which absorbent selectively absorbs carbon dioxide. The absorber 37 is provided with a suitable packing, such as trays or the like, to increase gas-liquid contact. A carbon dioxide enriched absorption solution is withdrawn from absorber 37 through line 38 for the regeneration of a lean absorption solution, as hereinafter more fully described. An ethylene enriched gaseous overhead containing entrained absorption solution is withdrawn from the absorber 37 through line 35.

The gaseous overhead in line 35 is passed through the preheater 34 to preheat the feed to the absorber 37 passing therethrough and is combined with fresh ethylene feed in line 39. The combined feed stream in line 35 is introduced into a gas-liquid separator or knock-out drum 41 to separate entrained absorption solution therefrom. A gaseous overhead comprising ethylene is withdrawn from the separator 41 through line 42 and is combined in line 12 with the remaining gas portion withdrawn from the compressor 31 through line 32. The net combined stream in line 12 is introduced into the mixing nozzle 11 and processed as hereinbefore described. Condensate or absorption solution is withdrawn from separator 41 through line 43 for further use as hereinafter described.

The carbon dioxide enriched absorption solution withdrawn from absorber 37 through line 38 is introduced into a stripper 44 operating at a pressure of about 5 p.s.i.g., an overhead temperature of about 210° F., and a bottoms temperature of about 240° F., to remove carbon dioxide therefrom. The stripping requirements for the stripper 44 are supplied by introducing steam through line 45 and a reboiled solution through line 46 as described more fully hereinafter. A carbon dioxide-steam overhead is withdrawn from the stripper 44 through line 47 and introduced into a heat exchanger 48 to recover heat therefrom. The coolant, demineralized water, for the heat exchanger 48 is introduced through line 49, at a temperature of about 70° F. with heated water being withdrawn from heat exchanger 48 through line 51 at a temperature of about 170° F. for use throughout the plant as make-up feed water (not shown). A portion of the steam introduced into heat exchanger 48 through line 47 is condensed and returned to the stripper 44 through line 52 to provide the reflux requirements of the tower. The uncondensed gases from heat exchanger 48 are vented to the atmosphere through line 53.

A carbon dioxide-free absorption solution is withdrawn as bottoms from stripper 44 through line 54 and a portion thereof introduced into the absorber 37 through line 40. Makeup absorption solution may be introduced into line 54 through line 55. The remaining portion of absorption solution in line 54 is mixed with make-up feed water introduced through line 56 and the mixture combined in line 21 with the condensate withdrawn from the gas-liquid separator 41 through line 43. The source of make-up feed water introduced through line 56 is the heated demineralized water withdrawn from the heat exchanger 48 through line 51.

The combined liquid in line 21 at a temperature of about 202° F. is passed through the heat exchanger 19 to cool the ethylene oxide reactor effluent in line 18 from a temperature of about 500° F. to a temperature of about 400° F. As a result of such indirect heat exchange relationship, a major portion of the liquid is vaporized. The gas-liquid mixture withdrawn from the heat exchanger 19 through line 46 at a temperature of about 250° F. is introduced into the stripper 44 to provide a portion of the stripping requirements for the stripper 44.

Although the process of the invention has been described with reference to the production of ethylene oxide, it should be readily apparent that it is equally applicable to the production of other olefinic oxides, such as propylene oxide.

The process of this invention reduces the utilities requirements for the production of olefinic oxides. The elimination of a reboiler for the carbon dioxide stripper significantly lowers both the installed cost and the utilities requirements for the overall plant and process. Moreover, the use of the stripper bottoms in line 54 as a coolant for reactor effluent provide a reactor effluent having a lower temperature, thus improving the heat recovery of the plant.

The use of the vent gas from the carbon dioxide stripper for heating make-up water eliminates the necessity for using high temperature condensate thereby further lowering utilities requirements.

Obviously many modifications and variations of the present invention are possible in the light of the above teachings. It is therefore to be understood, that within the scope of the appended claims, the invention may be practiced otherwise than as specifically described.

What is claimed is:

1. In a process for producing ethylene oxide wherein ethylene is oxidized in a reaction zone to produce ethylene oxide, the effluent from the reaction zone containing ethylene oxide, carbon dioxide, and unreacted ethylene is introduced into a cooling zone, the cooled effluent is introduced into an ethylene oxide absorption zone to absorb the ethylene oxide therefrom, the remaining effluent is introduced into a carbon dioxide absorption zone to remove carbon dioxide therefrom by contact with an absorption solution prior to recycle to the reaction zone, and the absorption solution is passed to a stripping zone to strip carbon dioxide therefrom prior to recycle to the absorption zone, the improvement comprising:

(a) passing a portion of the stripped absorption solution to the cooling zone in an indirect heat transfer relationship with the effluent from the reaction zone to raise the temperature of the absorption solution; and (b) recycling the heated absorption solution from the cooling zone to the stripping zone to supply a portion of the heat requirements for the stripping zone.

2. The process of claim 1 wherein vent gas from the stripping zone is passed in indirect heat transfer with water prior to venting to the atmosphere, said water being heated by vent gas for use as make-up water in the process.

3. The process of claim 2 wherein the effluent withdrawn from the carbon dioxide absorption zone is introduced into a gas-liquid separation zone prior to recycle to the reaction zone to remove entrained absorption solution therefrom, said absorption solution being combined with the portion of the absorption solution passed to the cooling zone.

4. The process of claim 3 wherein a portion of the water heated by the vent gas from the stripping zone is combined with the absorption solution passed to the cooling zone.

5. The process of claim 4 wherein the remaining effluent from the ethylene oxide absorption zone is compressed prior to introduction to the carbon dioxide absorption zone.

6. The process of claim 5 wherein the effluent introduced into the carbon dioxide absorption zone is passed in indirect heat transfer relationship with the effluent withdrawn from the carbon dioxide absorption zone.

References Cited

UNITED STATES PATENTS 3,343,916   9/1967   Cahn et al. _____ 55—62 X

OTHER REFERENCES

Osterreichischer Chemiker Zeitung, vol. 64, No. 4, April 1963, pp. 108–9.

Kirk-Othmer, vol. 8, pp. 536–538.

Jour. Inst. Petroleum, vol. 46 (1960), pp. 350–1

NORMA S. MILESTONE, Primary Examiner